Oct. 28, 1930.                    O. C. COX                    1,779,421
                                 CHECK VALVE
                              Filed May 26, 1928
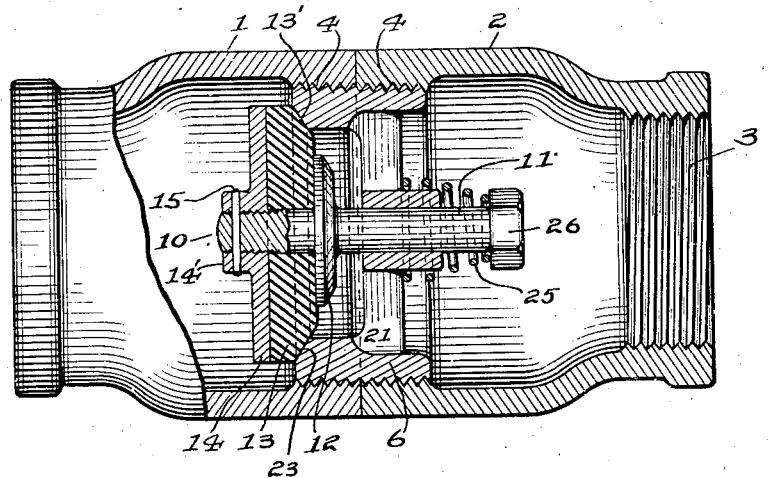
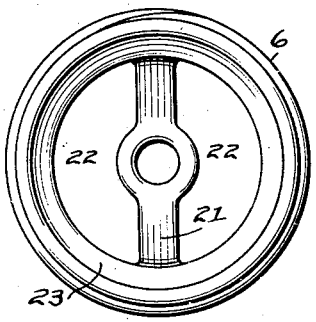
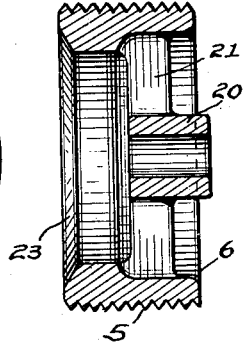
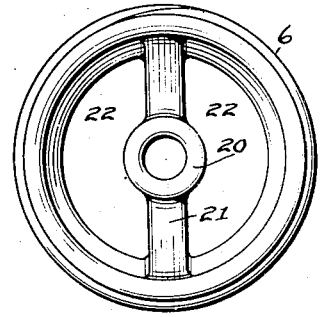
INVENTOR
Ora C. Cox.

Patented Oct. 28, 1930

1,779,421

UNITED STATES PATENT OFFICE

ORA C. COX, OF CHICAGO, ILLINOIS

CHECK VALVE

Application filed May 26, 1928. Serial No. 280,682.

The present invention relates to check valves and more particularly to check valves of the character commonly used in water lines, wells, cisterns, pumping outfits and the like, a principal object of the invention being to provide a check valve of improved design and construction and embodying features and advantages not found in check valves intended for similar uses as heretofore constructed.

Further objects of the invention are to provide a check valve which is operative to close rapidly without loss of water; in which the movable element or poppet is so guided that it will always seat properly under all conditions; which is noiseless in operation; which may be used in any desired position, and which is simple in design and so constructed as to facilitate manufacture and assembly as well as repair or replacement of parts after installation.

The invention further includes other objects and novel features of design, construction and arrangement hereinafter more particularly mentioned.

To enable those skilled in the art to comprehend and practise the invention, I have illustrated in the accompanying drawing and will now proceed to describe a preferred embodiment thereof but I do not thereby desire or intend to limit myself to any specific details of construction or arrangement of the various parts as minor changes and modifications may be made therein if desired without departing from the spirit and scope of the invention as hereinafter defined in the appended claims.

In the said drawing, Fig. 1 is a view of the valve principally in longitudinal central section; Fig. 2 is a central longitudinal section of the inner sleeve of the valve removed therefrom, and Figs. 3 and 4 are respectively elevations of the left hand end and of the right hand end of the sleeve when viewed as in Fig. 2. The same numerals are used to designate the same parts in the several figures.

As shown, the valve comprises a casing formed of two similar complementary parts 1 and 2 each of hollow cylindrical cross section and, desirably, of somewhat larger diameter adjacent one end than the other. The outer or smaller end of each section is interiorly threaded as at 3 to facilitate connection of the valve in a line of pipe, and these threads will therefore ordinarily be inwardly tapered. The inner or larger end of each section is likewise threaded as at 4 but preferably with straight as distinguished from tapered or pipe threads to thereby enable the two sections to be respectively screwed onto opposite ends of the correspondingly threaded outer surface 5 of a sleeve 6, best shown in Fig. 2, until the inner ends of the sections abut each other approximately midway between the ends of the sleeve as best shown in Fig. 1.

The sleeve thus forms an adequate and sufficient connection between the two sections of the casing to maintain them in assembled relation and, in addition, a support and guide as well as a seat for the poppet, generally designated as 10, and now to be described. As shown in Fig. 1, the poppet comprises a stem 11 provided with a preferably integral flange 12 which forms a seat for one face of a circular valve disk 13, which is desirably of rubber, and provided with an axial hole for the passage of the stem. The disk is maintained in position on the stem and to some extent supported by a removable circular plate 14 desirably provided with a central boss 14' and axially bored and threaded so it can be screwed onto the correspondingly threaded projecting extremity of the stem after the disk is positioned thereon so as to hold the latter in place; if desired a transversely disposed pin 15 or other suitable means may be provided for preventing the plate from backing off after it has been screwed into position on the stem.

For supporting and guiding the stem of the poppet the sleeve 6 is provided with a hollow cylindrical guide 20, coaxially disposed with and at the center of the sleeve, supported by a diametrically extending bar 21 which, together with the guide, is preferably integral with the sleeve. Since the bar is relatively narrow and the guide 20 occupies comparatively little space within the sleeve, opposed segmental openings 22 extending longitudinally through the latter are thus left for the passage of the fluid in its flow through the valve. One end of the sleeve is also arranged to form a seat for the valve disk 13 and for this purpose may desirably be inwardly beveled as at 23 and the adjacent corner of the valve disk 13 correspondingly beveled as at 13' for cooperation therewith. The sleeve and adjacent parts are preferably of bronze, brass or other non-corrodible metal so as to be substantially unaffected by the fluid passing through the valve and also preventing adherence of the sections of the casing to the sleeve through rusting of their mutually cooperative threads which might interfere with the removal of the sections of the casing from the sleeve if and when required.

To insure positive and rapid closing of the poppet on its seat, resilient means in the form of a coil spring 25 are provided and arranged to surround that end of the poppet stem which projects beyond the end of the guide opposite to that adjacent the disk 13 and also the adjacent end of the guide itself, the spring being held in place by a retaining nut 26 threaded onto the end of the stem. The spring is preferably under some compression at all times between the bar 21 on which its seats and the retaining nut 26, the amount of this compression being capable of variation by adjustment of the position of the nut on the stem; thus, when the poppet is raised from its seat, the spring is compressed somewhat more than normally and serves to rapidly and positively return the poppet to its seat when the pressure beneath the poppet becomes insufficient to overcome the force of the spring.

It will thus be evident that the several parts of the valve are of such character and design as to very readily lend themselves to efficient and economical manufacture and may be very readily assembled to form the complete valve while with equal facility the valve may be taken apart when required for the purposes of repair and the like. In fact, it will often be found unnecessary in effecting repairs such as renewal of the disk or of the spring to do more than remove one or the other of the casing sections from the sleeve as by so doing it is possible to obtain access to either the disk 13 or the spring 25 as required. Moreover, by the employment of the rubber disk instead of a metal poppet, silent operation and effective closing of the valve is insured while as the spring is operative to close the poppet independent of gravity the valve may be installed in any desired position as required.

Having thus described my invention, I claim and desire to protect by Letters Patent of the United States:

1. A check valve comprising an outer hollow generally cylindrical casing formed in two complementary longitudinally aligned separable sections having their juxtaposed ends internally threaded, a sleeve having a continuous external thread extending from one of its ends to the other and disposed within said sections, said sleeve being cooperative with said threaded ends of the sections to unite the sections in operatively assembled relation with their juxtaposed ends in abutting engagement, said sleeve being provided with a seat, a poppet including a rubber valve disk cooperative with said seat and having a stem axially disposed with respect to the sleeve and longitudinally movable in the valve, and means comprising a single diametrically extending relatively narrow bar integral with the sleeve for guiding and supporting the stem.

2. A check valve comprising an outer hollow generally cylindrical casing formed in two complementary longitudinally aligned separable sections having their juxtaposed ends internally threaded, a sleeve provided with a continuous external thread from one of its ends to the other and disposed within said sections, said sleeve being cooperative with said threaded ends of the section to unite the sections in operatively assembled relation with their juxtaposed ends in abutting engagement, said sleeve being provided with a seat, a poppet including a rubber valve disk cooperative with said seat and having a stem axially disposed with respect to the sleeve and longitudinally movable in the valve, means integral with the sleeve for guiding and supporting the stem, said means comprising a single diametrically extending relatively narrow bar whereby oppositely disposed segmental openings of relatively large size are provided on each side of the bar for the free passage of fluid through the valve, and resilient means operative to normally hold the disk on said seat but compressible to permit the disk to move away from said seat.

3. A check valve comprising a casing formed of two hollow cylindrical complementary axially aligned oppositely disposed reducing couplings respectively internally threaded at their inner juxtaposed extremities, a sleeve adapted to fully telescope within the juxtaposed ends of the coupling and externally threaded for cooperation with the inner threaded ends of said couplings to maintain said couplings in assembled relation and provided at one end with a seat, a guide, means for supporting the guide at the center of the sleeve, a poppet comprising a stem extending through the guide and longitudinally slidable therein and a rubber valve disk cooperative with the seat on said sleeve, and a coil spring surrounding said stem adjacent the guide and normally operative to maintain the disk against said seat but compressible to permit said valve to move away from the seat to permit the passage of fluid through said valve in one direction.

In witness whereof, I have hereunto set my hand this 18th day of May, 1928.

ORA C. COX.